US009316848B2

(12) United States Patent
Pugh et al.

(10) Patent No.: US 9,316,848 B2
(45) Date of Patent: Apr. 19, 2016

(54) OPHTHALMIC DEVICES WITH STABILIZATION FEATURES

(71) Applicant: Johnson & Johnson Vision Care, Inc., Jacksonville, FL (US)

(72) Inventors: Randall B. Pugh, Jacksonville, FL (US); Karson S. Putt, Jacksonville, FL (US); Edward R. Kernick, Jacksonville, FL (US); Frederick A. Flitsch, New Windsor, NY (US); Camille Higham, Jacksonville, FL (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 24 days.

(21) Appl. No.: 13/842,455

(22) Filed: Mar. 15, 2013

(65) Prior Publication Data

US 2014/0268033 A1     Sep. 18, 2014

(51) Int. Cl.
| | |
|---|---|
| *G02C 7/10* | (2006.01) |
| *G02C 3/00* | (2006.01) |
| *G02C 7/00* | (2006.01) |
| *G02C 7/02* | (2006.01) |
| *G02C 7/04* | (2006.01) |
| *B29D 11/00* | (2006.01) |
| *G02C 5/00* | (2006.01) |

(52) U.S. Cl.
CPC .......... *G02C 7/048* (2013.01); *B29D 11/00038* (2013.01); *B29D 11/00817* (2013.01); *G02C 5/001* (2013.01)

(58) Field of Classification Search
CPC ................... B29D 11/00192; B29D 11/00048; B29D 11/00057; B29D 11/00144; G02C 7/048; G02C 7/049; G02C 7/083; G02C 7/085; G02C 11/10
USPC ............ 351/159.74, 159.02, 159.36, 159.19, 351/159.03, 159.73; 264/1.32, 2.3, 2.6, 1.1, 264/2.7; 356/239.2
See application file for complete search history.

(56) References Cited

U.S. PATENT DOCUMENTS 3,431,327 A     3/1969  Tsuetaki
3,488,111 A *   1/1970  Isen .......................... 351/159.33
(Continued)

FOREIGN PATENT DOCUMENTS

EP            2512777 B1   10/2012
WO      WO 2004109358 A1 * 12/2004 ............... G02B 7/04

OTHER PUBLICATIONS

European Search Report for Application No. EP 14 15 9971 Date of Completion of Report Jun. 5 2014.
(Continued)

*Primary Examiner* — Bumsuk Won
*Assistant Examiner* — Collin X Beatty

(57) ABSTRACT

The present invention, as described above and as further defined by the claims below, provides methods for creating an Ophthalmic Lens with Stabilizing Features and a Rigid Insert, where the Stabilizing Features may orient the Ophthalmic Lens when placed on an eye. In some embodiment, the Stabilizing Features may be included as a unique Reactive Monomer Mixture with separate properties than the encapsulating RMM. Other embodiments may include Stabilizing Features comprising separate insert pieces. In alternate embodiments, the Rigid Insert may include the Stabilizing Features, such as, for example, through thermoforming techniques.

15 Claims, 8 Drawing Sheets

(56) References Cited

U.S. PATENT DOCUMENTS

| | | | | |
|---|---|---|---|---|
| 4,859,049 | A * | 8/1989 | Muller | 351/159.74 |
| 5,087,392 | A * | 2/1992 | Burke et al. | 264/2.7 |
| 5,100,225 | A * | 3/1992 | Rothe | 351/159.19 |
| 5,540,410 | A * | 7/1996 | Lust et al. | 249/134 |
| 5,861,114 | A * | 1/1999 | Roffman et al. | 264/2.5 |
| 5,971,542 | A * | 10/1999 | Volker et al. | 351/159.41 |
| 5,988,813 | A * | 11/1999 | Neadle et al. | 351/159.74 |
| 6,092,899 | A * | 7/2000 | Wanders | 351/159.48 |
| 6,595,639 | B1 * | 7/2003 | Ho et al. | 351/159.74 |
| 6,851,805 | B2 * | 2/2005 | Blum et al. | 351/159.03 |
| 6,971,746 | B2 * | 12/2005 | Back | 351/159.14 |
| 7,004,585 | B2 * | 2/2006 | Lindacher | 351/159.1 |
| 7,018,039 | B2 * | 3/2006 | Legerton et al. | 351/159.02 |
| 7,036,930 | B2 * | 5/2006 | Jubin et al. | 351/159.74 |
| 7,040,757 | B2 * | 5/2006 | Hall et al. | 351/159.1 |
| 7,080,906 | B2 * | 7/2006 | Lindacher | 351/159.09 |
| 7,159,979 | B2 * | 1/2007 | Jubin et al. | 351/159.05 |
| 7,201,480 | B2 * | 4/2007 | Neadle et al. | 351/159.14 |
| 7,216,978 | B2 * | 5/2007 | Perez et al. | 351/159.74 |
| 7,585,074 | B2 * | 9/2009 | Dahi et al. | 351/159.33 |
| 7,758,187 | B2 * | 7/2010 | Amirparviz | 351/159.28 |
| 8,142,016 | B2 * | 3/2012 | Legerton et al. | 351/159.73 |
| 8,231,218 | B2 * | 7/2012 | Hong et al. | 351/159.02 |
| 2002/0024631 | A1 * | 2/2002 | Roffman et al. | 351/161 |
| 2002/0071094 | A1 * | 6/2002 | Roffman et al. | 351/160 R |
| 2004/0027536 | A1 | 2/2004 | Blum et al. | |
| 2005/0041201 | A1 * | 2/2005 | Shapiro | 351/158 |
| 2005/0256570 | A1 * | 11/2005 | Azar | 623/5.14 |
| 2007/0019155 | A1 * | 1/2007 | Back | 351/161 |
| 2007/0035050 | A1 * | 2/2007 | Rogers | 264/1.32 |
| 2007/0267765 | A1 * | 11/2007 | Ansell et al. | 264/1.36 |
| 2009/0213459 | A1 | 8/2009 | Amirparviz | |
| 2010/0072643 | A1 | 3/2010 | Pugh et al. | |
| 2010/0110372 | A1 | 5/2010 | Pugh et al. | |
| 2011/0149231 | A1 * | 6/2011 | Gerligand et al. | 351/160 R |
| 2012/0120365 | A1 | 5/2012 | Legerton et al. | |
| 2012/0140167 | A1 * | 6/2012 | Blum | 351/159.34 |
| 2012/0206691 | A1 * | 8/2012 | Iwai | 351/159.03 |
| 2012/0236524 | A1 | 9/2012 | Pugh et al. | |
| 2013/0208237 | A1 * | 8/2013 | Hawke et al. | 351/159.36 |

OTHER PUBLICATIONS

Singapore Search Report—Application No. 10201400343W Date of submission of the request to the Intellectual Property Office of Singapore: Aug. 4 2014; Date of actual completion of the search: Dec. 31 2014; Date received from Agent Mar. 24 2015.

Singapore Search Report—Application No. 10201400343W Date of submission of the request to the Intellectual Property Office of Singapore: Aug. 4, 2014; Date of actual completion of the search: Oct. 2, 2015; Date received from Agent Nov. 4, 2015.

* cited by examiner

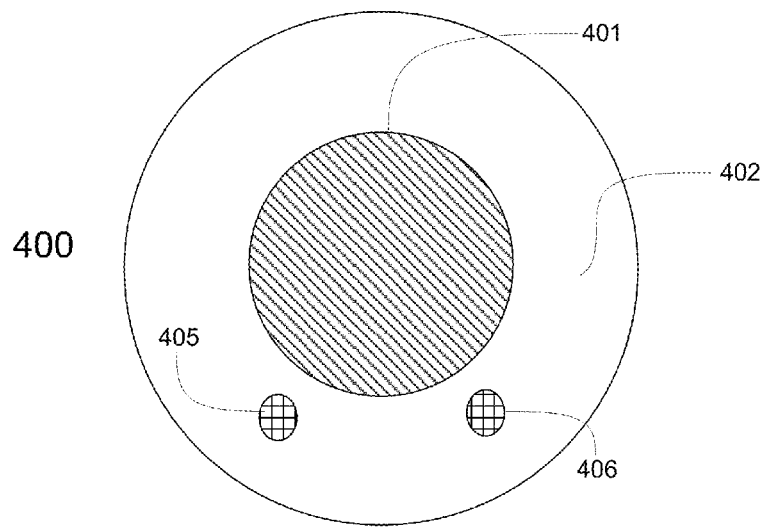
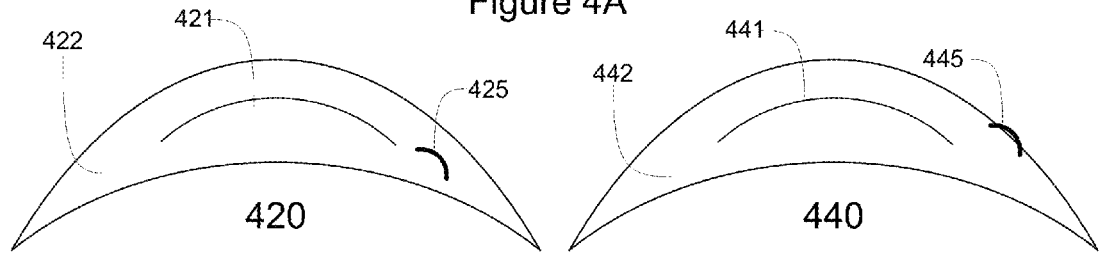
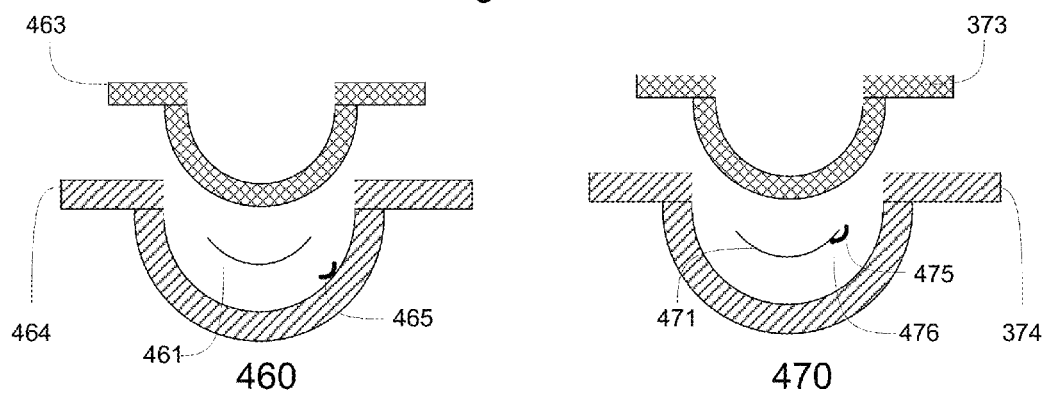
Figure 4A
Figure 4B
Figure 4C

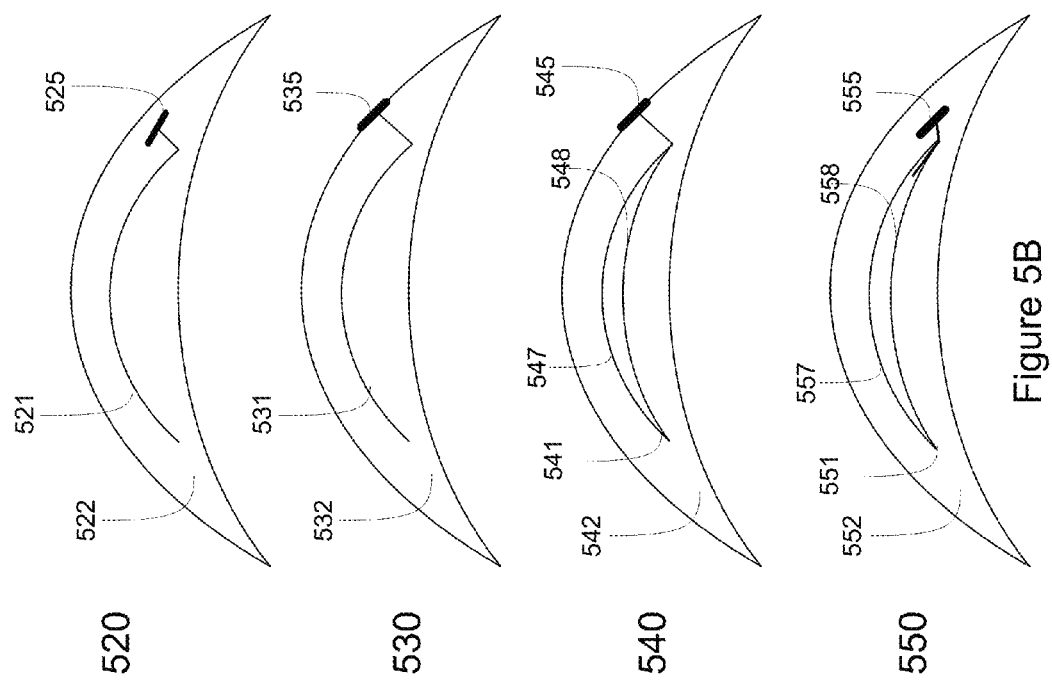
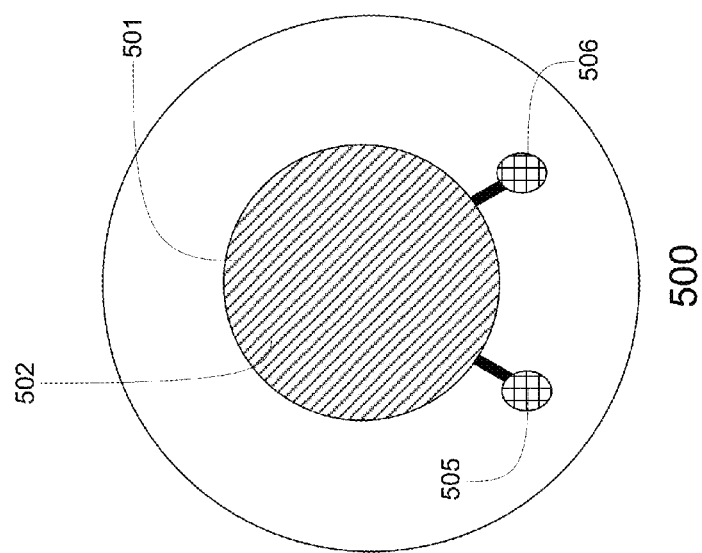
Figure 5A
Figure 5B

```
┌─────────────────────────────────────────────────────────────┐
│ FORM A RIGID INSERT WITH A FUNCTIONALITY THAT DEPENDS ON A  │
│         SPECIFIC ALIGNMENT WITH THE OPTIC ZONE          605 │
└─────────────────────────────────────────────────────────────┘

┌─────────────────────────────────────────────────────────────┐
│ DEPOSIT STABILIZING FEATURE MATERIAL IN A LOCATION THAT WILL│
│  BE BETWEEN THE FRONT CURVE MOLD AND BACK CURVE MOLD,       │
│ WHEREIN THE STABILIZING FEATURES MAY ORIENT THE OPHTHALMIC  │
│                   LENS ON AN EYE                       610  │
└─────────────────────────────────────────────────────────────┘

┌─────────────────────────────────────────────────────────────┐
│    OPTIONALLY PRECURE THE STABILIZING FEATURE MATERIAL      │
│                                                        615  │
└─────────────────────────────────────────────────────────────┘

┌─────────────────────────────────────────────────────────────┐
│  OPTIONALLY PROMOTE ADHESION BETWEEN THE STABILIZING        │
│   FEATURE MATERIAL AND THE REACTIVE MONOMER MIX        620  │
└─────────────────────────────────────────────────────────────┘

┌─────────────────────────────────────────────────────────────┐
│  ALIGN THE RIGID INSERT WITH THE STABILIZING FEATURES, WHEREIN│
│      ORIENTATION ON THE EYE ALLOWS FOR THE INTENDED         │
│           FUNCTIONALITY OF THE RIGID INSERT                 │
│                                                        625  │
└─────────────────────────────────────────────────────────────┘

┌─────────────────────────────────────────────────────────────┐
│  PLACE THE RIGID INSERT BETWEEN THE FRONT CURVE MOLD AND    │
│                   THE BACK CURVE MOLD                       │
│                                                        630  │
└─────────────────────────────────────────────────────────────┘

┌─────────────────────────────────────────────────────────────┐
│          DEPOSIT A REACTIVE MIXTURE IN A LOCATION           │
│     THAT WILL BE BETWEEN A FRONT CURVE MOLD AND A           │
│                   BACK CURVE MOLD                      635  │
└─────────────────────────────────────────────────────────────┘

┌─────────────────────────────────────────────────────────────┐
│ POSITION THE FIRST MOLD PART PROXIMATE TO THE SECOND MOLD   │
│ PART TO FORM A LENS CAVITY WITH THE REACTIVE MONOMER MIX    │
│   AND THE COMBINED INSERT IN THE LENS CAVITY           640  │
└─────────────────────────────────────────────────────────────┘

┌─────────────────────────────────────────────────────────────┐
│         OPTIONALLY PRECURE REACTIVE MONOMER MIX        645  │
└─────────────────────────────────────────────────────────────┘

┌─────────────────────────────────────────────────────────────┐
│     POLYMERIZE THE REACTIVE MIXTURE TO FORM AN OPHTHALMIC   │
│                         LENS                           650  │
└─────────────────────────────────────────────────────────────┘
```

Figure 6

```
┌─────────────────────────────────────────────────────────────────┐
│  FORM A RIGID INSERT WITH A FUNCTIONALITY THAT DEPENDS ON A     │
│       SPECIFIC ALIGNMENT WITH THE OPTIC ZONE          705       │
└─────────────────────────────────────────────────────────────────┘

┌─────────────────────────────────────────────────────────────────┐
│              FORM STABILIZING FEATURE INSERTS                   │
│                                                       710       │
└─────────────────────────────────────────────────────────────────┘

┌─────────────────────────────────────────────────────────────────┐
│  PLACE THE STABILIZING FEATURE INSERTS IN A LOCATION THAT WILL  │
│  BE BETWEEN THE FRONT CURVE MOLD AND THE BACK CURVE MOLD,       │
│  WHEREIN THE STABILIZING FEATURES MAY ORIENT THE OPHTHALMIC     │
│              LENS ON AN EYE                            715      │
└─────────────────────────────────────────────────────────────────┘

┌─────────────────────────────────────────────────────────────────┐
│  ALIGN THE RIGID INSERT WITH THE STABILIZING FEATURES, WHEREIN  │
│     ORIENTATION ON THE EYE ALLOWS FOR THE INTENDED              │
│           FUNCTIONALITY OF THE RIGID INSERT                     │
│                                                       720       │
└─────────────────────────────────────────────────────────────────┘

┌─────────────────────────────────────────────────────────────────┐
│   PLACE THE RIGID INSERT BETWEEN THE FRONT CURVE MOLD PIECE     │
│              AND THE BACK CURVE MOLD PIECE                      │
│                                                       725       │
└─────────────────────────────────────────────────────────────────┘

┌─────────────────────────────────────────────────────────────────┐
│  OPTIONALLY APPLY ADHESIVE TO A CONNECTION POINT BETWEEN        │
│  THE STABILIZING FEATURE INSERTS AND THE RIGID INSERT           │
│                                                       730       │
└─────────────────────────────────────────────────────────────────┘

┌─────────────────────────────────────────────────────────────────┐
│         DEPOSIT A REACTIVE MIXTURE IN A LOCATION                │
│      THAT WILL BE BETWEEN A FIRST MOLD PART AND A               │
│               SECOND MOLD PART                        735       │
└─────────────────────────────────────────────────────────────────┘

┌─────────────────────────────────────────────────────────────────┐
│  POSITION THE FIRST MOLD PART PROXIMATE TO THE SECOND MOLD      │
│  PART TO FORM A LENS CAVITY WITH THE REACTIVE MONOMER MIX       │
│     AND THE COMBINED INSERT IN THE LENS CAVITY        740       │
└─────────────────────────────────────────────────────────────────┘

┌─────────────────────────────────────────────────────────────────┐
│      POLYMERIZE THE REACTIVE MIXTURE TO FORM AN OPHTHALMIC      │
│                          LENS                         745       │
└─────────────────────────────────────────────────────────────────┘

┌─────────────────────────────────────────────────────────────────┐
│       REMOVE OPHTHALMIC LENS FROM MOLDING APPARATUS             │
│                                                       750       │
└─────────────────────────────────────────────────────────────────┘
```

Figure 7

OPHTHALMIC DEVICES WITH STABILIZATION FEATURES

FIELD OF USE

This invention describes methods, apparatus and devices related to the inclusion of stabilization features into Ophthalmic Devices and more specifically, in some embodiments, where orientation on the eye is significant to the functionality of the Ophthalmic Device.

BACKGROUND

Traditionally, an Ophthalmic Device, such as a contact lens, an intraocular lens, or a punctal plug included a biocompatible device with a corrective, cosmetic, or therapeutic quality. A contact lens, for example, can provide one or more of vision correcting functionality, cosmetic enhancement, and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics may be accomplished without the lens entering into an energized state. The functionality of the Lens may depend on a specific orientation of the Lens on the eye. Accordingly, a need to stabilize the orientation on the eye may be significant.

More recently, active components have been incorporated into a contact lens, and the incorporation may involve encapsulating energizing elements within the Ophthalmic Device. The relatively complicated components to accomplish this effect may derive improved characteristics by including them in insert devices which are then included with standard or similar materials useful in the fabrication of state of the art Ophthalmic Lenses. It may be desirable to improve the process, methods and resulting devices for realizing inserts of various kinds. And, it may be anticipated that some of the solutions for energized inserts may provide novel aspects for non-energized devices and other biomedical devices. Accordingly novel methods, devices and apparatus relating to the thermoforming of various components in ophthalmic and biomedical devices formed with inserts are therefore important.

SUMMARY

The present invention includes innovations relating to a method of manufacturing an Ophthalmic Device with Stabilizing Features, the method may comprise the steps of forming a lens, wherein the lens comprises a biocompatible material; encapsulating a Rigid Insert within the lens, wherein the Rigid Insert is capable of providing functionality to the Ophthalmic Device, and the functionality depends on a specific orientation of the Ophthalmic Device on the eye; and adding a Stabilizing Feature to the Ophthalmic Device, wherein the Stabilizing Feature is capable of orienting the Ophthalmic Device on an eye. In some embodiments, The Stabilizing Feature may further comprise coloration or a marking, wherein the coloration or the marking comprises a visual orientation cue.

In some embodiments, the forming of the Ophthalmic Lens may further comprise the steps of adding a Reactive Monomer Mixture to one or both a front curve mold and a back curve mold part; placing the back curve mold proximate to the front curve mold; curing the Reactive Monomer Mixture to form the Ophthalmic Device; demolding the Ophthalmic Lens from the front curve mold part and the back curve part; and hydrating the Ophthalmic Lens. In some embodiments, the adding of the biocompatible polymer and the adding of the Stabilizing Feature occur simultaneously. In some embodiments, the adding of the Stabilizing Feature may further comprise the steps of injecting the Stabilizing Feature into the Reactive Monomer Mixture. In some embodiments, The Stabilizing Feature may comprise a curable material, wherein a swellable index of the curable material is different from a swellable index of the biocompatible material. The adding of the Stabilizing Feature may occur at an aberration on a surface of the front mold part in contact with the biocompatible polymer.

Alternatively, the Stabilizing Feature may comprise a stabilizing insert piece, wherein the stabilizing insert piece may comprise a first thermoformed Three-dimensional Shape. The Rigid Insert may comprise a second thermoformed Three-dimensional Shape. The inclusion of the Rigid Insert may add the Stabilizing Feature to the Ophthalmic Lens, for example, where the Rigid Insert and Stabilizing Feature may be thermoformed from the same thermoformable sheet.

In some such embodiments, the stabilizing insert pieces may be aligned with the functionality of the Rigid Insert and adhered to the Rigid Insert. A second curable material may temporarily adhere the stabilizing insert piece to the Rigid Insert. For example, after encapsulation of the Rigid Insert, the second curable material may be at least partially cured, wherein the curing separates the stabilizing insert from the Rigid Insert. This may place the stabilizing insert piece at a specific depth within the Ophthalmic Lens or at specific distance from the Rigid Insert.

DESCRIPTION OF THE DRAWINGS

FIG. 4A-4C illustrate alternate embodiments of an Ophthalmic Lens with Stabilizing Features, wherein the Stabilizing Features are separate from the Rigid Inserts.

FIG. 5A-5B illustrate exemplary embodiments of an Ophthalmic Lens with Stabilizing Features, wherein the Stabilizing Features are included with the Rigid Insert.

FIG. 6 illustrates an exemplary process flowchart for forming an Ophthalmic Lens with Stabilizing Feature, wherein the Stabilizing Features are separate from the Rigid Insert.

FIG. 7 illustrates an alternate process flowchart for forming an Ophthalmic Lens with Stabilizing Features, wherein the Stabilizing Features are separate from the Rigid Insert.

DETAILED DESCRIPTION OF THE INVENTION

Figure 1:
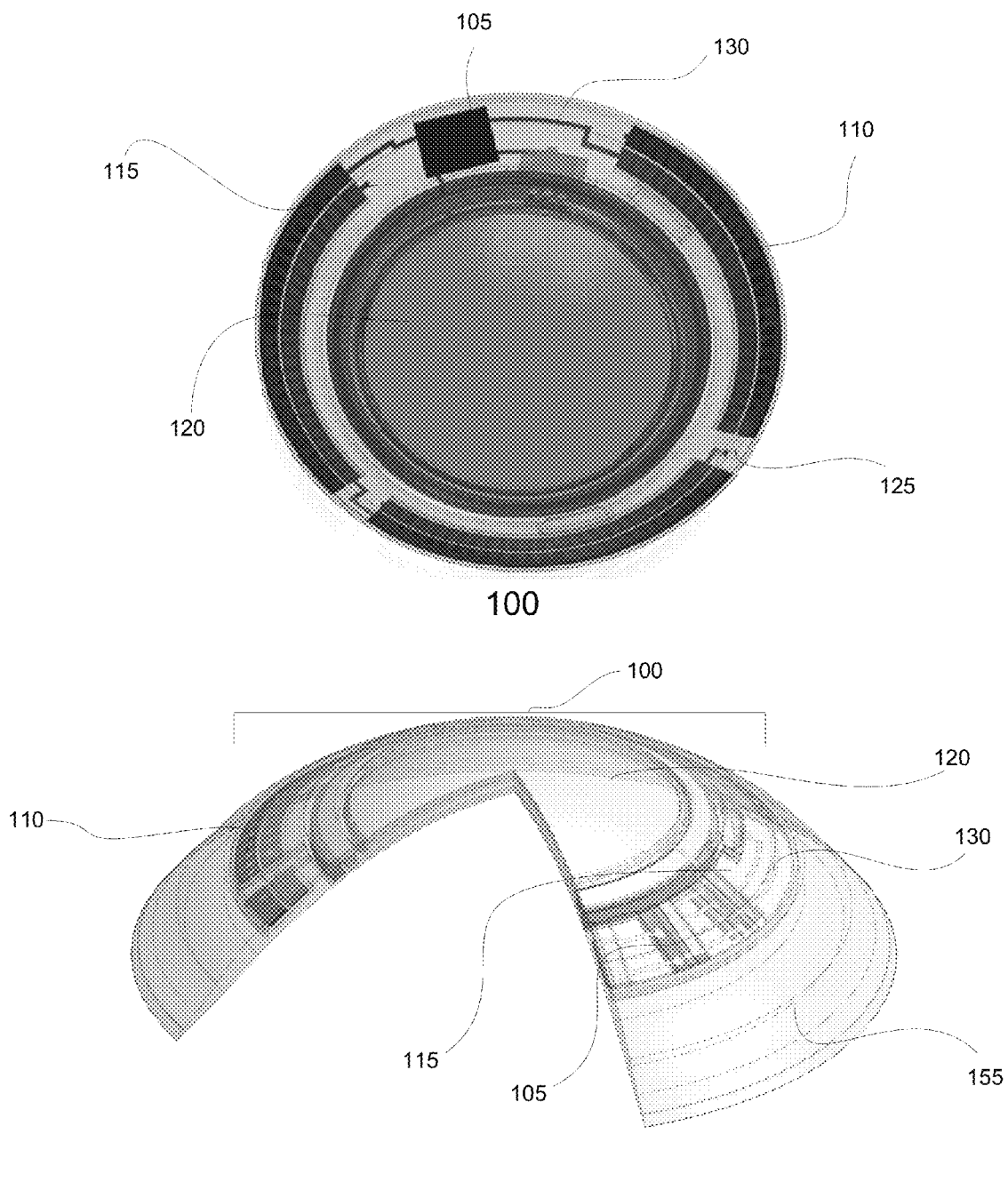
FIG. 1 illustrates an exemplary embodiment of a Media Insert for an energized Ophthalmic Device and an exemplary embodiment of an energized Ophthalmic Device.

The present invention includes methods and apparatus for manufacturing an Ophthalmic Lens with a Rigid Insert wherein the Ophthalmic Lens includes Stabilizing Features. In addition, the present invention includes an Ophthalmic Lens with a Rigid Insert, wherein the Ophthalmic Lens includes Stabilizing Features. According to the present invention, an Ophthalmic Lens is formed with a Rigid Insert, and Stabilizing Features may be incorporated into the Ophthalmic Lens. In some embodiments, the functionality of the Ophthalmic Lens may depend on a specific orientation on the eye.

In some cases, the Rigid Insert may comprise multiple pieces that create a cavity. The cavity may include an Energy Source, such as an electrochemical cell or battery as the storage means for the energy. In some embodiments, a Rigid Insert also includes a pattern of circuitry, components, and Energy Sources. Various embodiments may include the Rigid Insert locating the pattern of circuitry, components, and Energy Sources around a periphery of an Optic Zone through which a wearer of a lens would see, while other embodiments may include a pattern of circuitry, components, and Energy Sources that are small enough to not adversely affect the sight of a contact lens wearer allowing placement of the electrical elements within the Optic Zone.

The insert pieces of the Rigid Insert may be formed by thermoforming, and there may be numerous steps that occur on a thin substrate sheet before thermoforming or on an insert piece after thermoforming that may address the functionalities of insert-based Ophthalmic Devices.

In general, according to some embodiments of the present invention, a Rigid Insert may be embodied within an Ophthalmic Lens via automation that places the insert a desired location relative to a mold part used to fashion the lens. Some embodiments that place the insert pieces into the Ophthalmic Lens may include steps to seal or encapsulate the insert piece.

Some embodiments may include a cast molded silicone hydrogel contact lens with a rigid or formable energized insert contained within the Ophthalmic Lens in a biocompatible fashion where patterning may occur on surfaces of the insert or at or near the surface of the Ophthalmic Device itself. Still further embodiments may derive from thermoforming of insert pieces, wherein the insert formed from the pieces contains components that may not be energized or may reside in an Ophthalmic Device which is not energized.

Any of the various methods of forming the ophthalmic inserts by use of thermoforming may be further used in some embodiments to create Ophthalmic Lens devices. By positioning an insert within a cavity defined by front and back curve mold pieces and surrounding the insert with Reactive Mixture, which may then be polymerized, an Ophthalmic Lens may be formed. In some embodiments the insert may be positioned in a small amount of a reactive material which may then be polymerized, and next the cavity between the mold pieces may be filled with Reactive Mixture that may then be polymerized.

In the following sections, detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

Glossary

In this description and claims directed to the presented invention, various terms may be used for which the following definitions will apply:

Back Curve Piece or Back Insert Piece: as used herein (and sometimes as an insert back curve) refers to a solid element of a multi-piece Rigid Insert which when assembled into the said insert will occupy a location on the side of the lens that is on the back. In an Ophthalmic Device, such a piece would be located on the side of the insert that would be closer to the user's eye surface. In some embodiments the back curve piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple back curve pieces and one of them may include the optic zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Front Curve Piece or Front Insert Piece: as used herein (and sometimes as an insert front curve) refers to a solid element of a multi-piece Rigid Insert which when assembled into the said insert will occupy a location on the side of the lens that is on the front. In an Ophthalmic Device, a Front Curve Piece would be located on the side of the insert that would be further from the user's eye surface. In some embodiments, the piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple front curve pieces and one of them may include the optic zone, while others may be annular or portions of an annulus.

Lens-forming mixture or Reactive Mixture or Reactive Monomer Mixture (RMM): as used herein refers to a monomer or prepolymer material that can be cured and cross-linked or cross-linked to form an Ophthalmic Lens. Various embodiments can include lens-forming mixtures with one or more additives such as UV blockers, tints, photoinitiators or catalysts, and other additives one might desire in an Ophthalmic Lenses such as, contact or intraocular lenses.

Lens-forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens forming surface can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: refers to a rigid or semi-rigid object that may be used to form lenses from uncured formulations. Some preferred molds include two mold parts forming a front curve Mold part and a back curve Mold part.

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: To restore to a state with higher capacity to do work. Many uses within this invention may relate to restoring a device to the capability to flow electrical current at a certain rate for a specified, reestablished time period.

Released from a mold: means that a lens is either completely separated from the mold, or is only loosely attached so that it can be removed with mild agitation or pushed off with a swab.

Rigid Insert: as used herein refers to an insert that maintains a predefined topography. When included in a Contact Lens, the Rigid Insert may contribute to the functionality of the Lens. For example, varying topography of or densities within the Rigid Insert may define zones, which may correct vision in users with astigmatism. In some embodiments, an Insert Device may comprise multiple insert pieces.

Stabilizing Feature: as used herein refers to a physical characteristic that stabilizes an Ophthalmic Device to a specific orientation on the eye, when the Ophthalmic Device is placed on the eye. In some embodiments, the Stabilizing Feature may add sufficient mass to ballast the Ophthalmic Device. In some embodiments, the Stabilizing Feature may alter the front curve surface, wherein the eyelid may catch the Stabilizing Feature and the user may reorient the Lens by blinking. Such embodiments may be enhanced by including Stabilizing Features that may add mass. In some exemplary embodiments, Stabilizing Features may be a separate material from the encapsulating biocompatible material, may be an insert formed separately from the molding process, or may be included in the Rigid Insert or Media Insert.

Stacked Integrated Component Devices or SIC Devices as used herein refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours.

Swellable Index: as used herein refers to the expandability or expanding tendency of a specific material during the manufacturing of an Ophthalmic Lens.

Three-dimensional Surface or Three-dimensional Substrate: as used herein refers to any surface or substrate that has been three-dimensionally formed where the topography is designed for a specific purpose, in contrast to a planar surface.

Stabilizing Features

In some embodiments of Ophthalmic Lenses, the functionality of the Lens depends on a specific orientation on the eye. For example, in Lenses that currently address vision correction for astigmatic patients, Stabilizing Features orient the Lens to properly mirror the astigmatism. Incorporating a Rigid Insert into an Ophthalmic Lens may expand the number of functions that an Ophthalmic Lens may provide. These functions may further require Stabilizing Features. Current Stabilizing Features address basic orientation needs in relatively homogenous Lenses. Though the Lenses may have a defined Three-dimensional Surface, the material may be consistent throughout the Lens, including the Stabilizing Features. In addition, current Stabilizing Features are included as aberrations on the surface of the mold that creates the Three-dimensional Surface of the Ophthalmic Lens.

In contrast, a Rigid Insert may be created independently and then inserted within a molding apparatus prior to the formation of the Ophthalmic Lens. The Rigid Insert may comprise a separate material than the encapsulant, which may be a soft biocompatible polymer. The Rigid Insert may provide the functionality of the Ophthalmic Lens. Therefore, the Stabilizing Features may orient the Ophthalmic Lens on the eye in relation to the Rigid Insert. This may require complex methods of manufacturing Stabilizing Features and including them within the Ophthalmic Lens consistent with relative placement of the Rigid Insert to the Stabilizing Features during the molding process. Such methods may depend on the specific embodiment of the Ophthalmic Lens and the corresponding Rigid Insert.

Proceeding to FIG. 1, an exemplary embodiment of an Ophthalmic Lens with a Rigid Insert with energized elements is illustrated. In some embodiments, the Rigid Insert 100 may be included in an Ophthalmic Lens 150, which may comprise a polymeric biocompatible material, such as, for example, a silicone hydrogel. The Ophthalmic Lens 150 may include a rigid center, soft skirt design wherein a central rigid optical element comprises the Rigid Insert 100. In some specific embodiments, the Rigid Insert 100 may be in direct contact with the atmosphere and the corneal surface on respective anterior and posterior surfaces, or alternatively, the Rigid Insert 100 may be encapsulated in the Ophthalmic Device 150. The periphery 155 or, in some embodiments, the encapsulant of the Ophthalmic Lens 150 may be a soft skirt material, including, for example, a hydrogel material.

A Rigid Insert with energization elements is illustrated for exemplary purposes only. Some embodiments, for example, may include single piece Rigid Inserts, wherein the functionality is included on the surface or within the composition of the Rigid Insert. Alternatively, the Rigid Insert may comprise multiple pieces with passive elements that, when combined, provide a static functionality.

Figure 2:
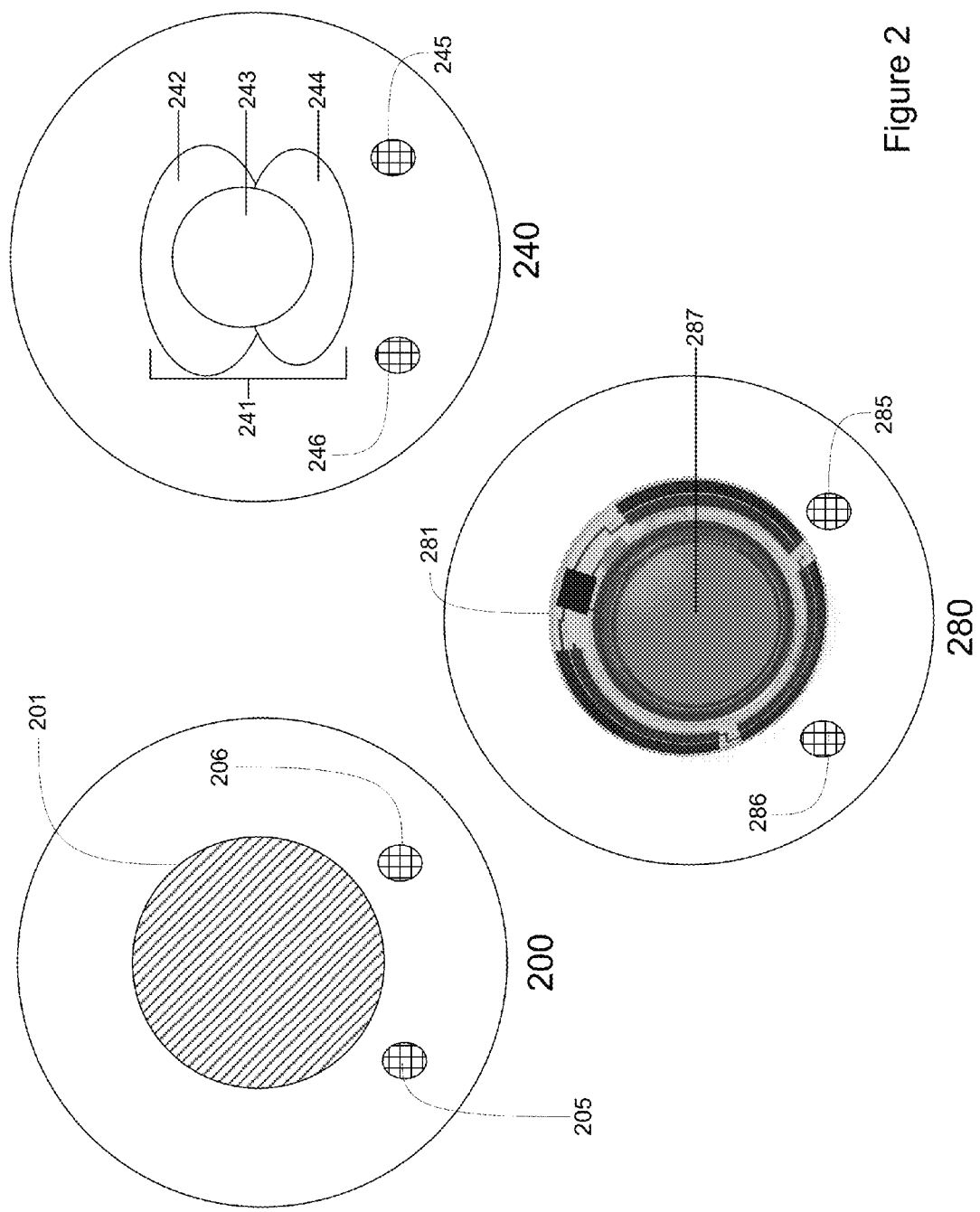
FIG. 2 illustrates exemplary embodiments of Ophthalmic Lenses with Rigid Inserts where the functionality may depend on a specific orientation on an eye.

Proceeding to FIG. 2, exemplary embodiments of Ophthalmic Lenses 200, 240, 280 with Rigid Inserts 201, 241, 281 are illustrated, wherein the Rigid Insert 201, 241, 281 included in the Ophthalmic Lenses 200, 240, 280 provide different functionalities that may require Stabilizing Features 205, 206, 245, 246, 285, 286. In some embodiments, the Ophthalmic Lens 200 may include a Rigid Insert 201 that provides a polarizing function. The polarization may be directional and may require a specific orientation of the Ophthalmic Lens 200 on the eye. Stabilizing Features 205, 206 may ensure the Rigid Insert 201 is oriented correctly when the Ophthalmic Lens 200 is placed on the eye.

Other embodiments may include an Ophthalmic Lens 240 with a Rigid Insert 241 that corrects vision for astigmatic patients. To accommodate the varied curvatures of the eye, the Rigid Insert 241 may be asymmetrical. For example, the Rigid Insert 241 may include zones 242-244, wherein each zone 242-244 corrects a different angle of refraction. Each zone 242-244 may be tailored to a particular set of astigmatic characteristics. Accordingly, Stabilizing Features 245, 246 may properly orient the Ophthalmic Lens 240 so that the zones 242-244 properly align with the their corresponding curvature of the eye.

A Rigid Insert 241 may be more effective in correcting astigmatism than a simple soft Ophthalmic Lens, which may not allow for precise vision correcting. Incorporating the Rigid Insert 241 within an Ophthalmic Lens 240 may be more comfortable than a typical rigid gas permeable lens. Adding Stabilizing Features 245, 246 may combine comfort and precise vision correction for astigmatism.

In other alternative embodiments, the Rigid Insert 281 included in an Ophthalmic Lens 280 may comprise multiple pieces, which may create a cavity for inclusion of active electric components. In such embodiments, the Rigid Insert 281 may comprise a variable optic portion 287, for example, a liquid meniscus lens, wherein the activation of the liquid meniscus alters the corrective power of the Lens. To activate, the Rigid Insert 281 may include a load, a Power Source, and conductive traces in the periphery of the insert, so that the electronic components may not impede the Optic Zone 287.

In some embodiments, a Rigid Insert 281 with a variable optic portion 287 may not be symmetrical. In some such embodiments, the different components may add different amounts of mass. For example, the load may add significantly more mass than the conductive traces and the Power Source. Without Stabilizing Features 285, 286, the load may pull the Ophthalmic Lens down so that the variable optic portion 287 does not align with the Optic Zone of the eye. In such embodiments, Stabilizing Features 285, 286 may also orient the Ophthalmic Lens 280 on the eye to mitigate discomfort.

The embodiments in FIG. 2 are shown for exemplary purposes only and other functionalities of the Ophthalmic Lens may require a specific orientation on the eye. A functionality that requires orientation may be presumed for the following figures. For illustrative purposes, the Rigid Inserts are shown to include a function shown in FIG. 2, but Rigid Inserts may provide other functions, and those functionalities should be considered within the scope of the inventive art.

Figure 3A:
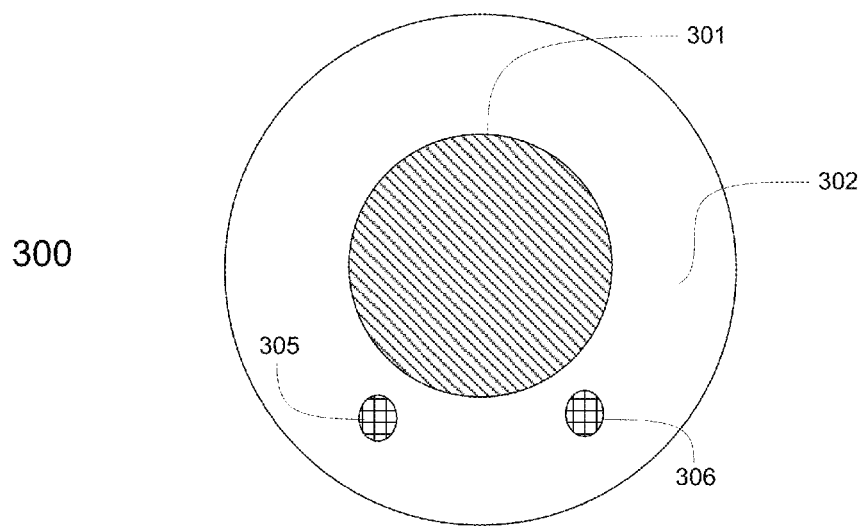
FIG. 3A-3C illustrate exemplary embodiments of an Ophthalmic Lens with Stabilizing Features, wherein the Stabilizing Features are separate from the Rigid Insert.

Proceeding to FIG. 3A, an exemplary embodiment of Ophthalmic Lens 300 that includes a polarizing Rigid Insert 301 and Stabilizing Features 305, 306 is illustrated. In some embodiments, the Stabilizing Features 305, 306 may be included in the soft biocompatible portion 302, comprising a polymerized RMM, such as hydrogel, of the Ophthalmic Lens 300. In such embodiments, the Stabilizing Features 305, 306 may be a different material than the soft portion 302. For example, the Stabilizing Feature 305, 306 may comprise a denser material than the surrounding soft portion 302 or the Stabilizing Feature 305, 306 may comprise a material with a different Swellable Index than the soft portion 302. For example, the different Swellable Index may allow for the Stabilizing Feature to swell at a different rate, may allow the Stabilizing Feature to swell more than the encapsulant, or may allow a combination thereof.

Figure 3B:
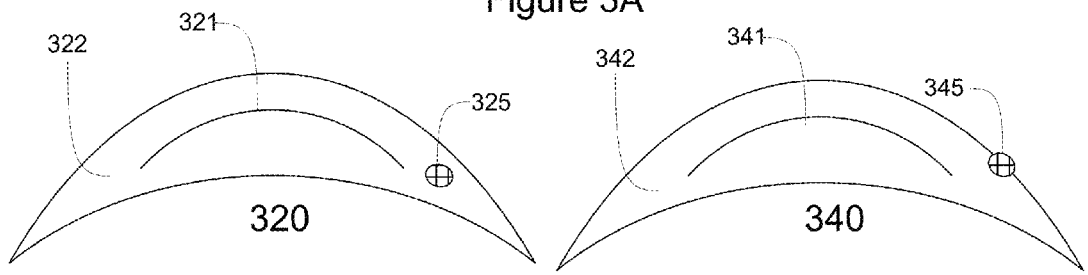

Proceeding to FIG. 3B, exemplary embodiments of Ophthalmic Lenses 320, 340 including a Rigid Insert 321, 341 and Stabilizing Features 325, 345 are shown in cross section, wherein the Stabilizing Features 325, 345 are independent from the Rigid Insert 321, 341. In said exemplary embodiments, the Stabilizing Features 325, 345 comprise a material different from the soft portion 322, 342, wherein the distinct material is included in the soft portion 322, 342. In some embodiments, the Stabilizing Feature 325 may be fully encapsulated within the soft portion 322 of the Ophthalmic Lens 320, wherein the Stabilizing Feature 325 does not affect the front surface topography of the Ophthalmic Lens. In such embodiments, the added mass of the Stabilizing Feature 325 may be sufficient to orient the Ophthalmic Lens 320 on the eye.

In alternate embodiments, the Stabilizing Feature 345 may alter the front surface topography of the Ophthalmic Lens 340. In such embodiments, when a user blinks, the eyelid may catch the Stabilizing Feature 345 so that each blink reorients the Ophthalmic Lens 340 on the eye. The Stabilizing Feature 345 may also add mass to a specific region of the soft portion 342 of the Ophthalmic Lens 340, which may enhance the stability of the Lens on the eye.

Figure 3C:
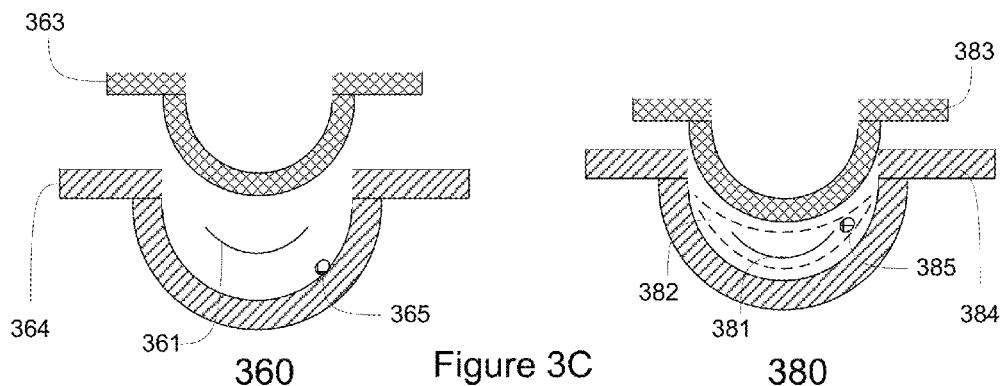

Proceeding to FIG. 3C, exemplary embodiments of a molding apparatus 360, 380 for the formation of an Ophthalmic Lens that includes a Rigid Insert 361, 381 and Stabilizing Features 365, 385 are illustrated in cross section. The Stabilizing Features 365, 385 may be included in positions relative to the Rigid Inserts 361, 381, wherein the Stabilizing Features 365, 385 may orient an Ophthalmic Lens that includes the Rigid Insert 361, 381 on the eye in a manner that enables the intended functionality of the Lens.

In some embodiments, the Rigid Insert 361, 381 may be formed through a process of cutting out insert pieces from thermoforming material, wherein alignment features may be cut into the insert piece such as notches, grooves, or flats for example. These features may be used to align the insert piece or formed ophthalmic insert devices in subsequent processing. Alignment features on the insert piece may be useful in precision placement of the components. The equipment that processes the thin film substrate may utilize these features to move the sheet and attached or holding hardware to an internal alignment location within its operating space. For example, some insert pieces may have notches for an apparatus to place the piece with precision and may include grooves and to ensure proper alignment with another piece or with the molding apparatus.

In some embodiments, the apparatus may include molding the Ophthalmic Lens between a Front Curve Mold 364, 384 and Back Curve Mold 363, 383. A Rigid Insert 361, 381 may be included between the Mold Pieces 363, 364, 383, 384 prior to adding the encapsulating monomer. The monomer may then be polymerized through a curing process.

In some embodiments, the Stabilizing Feature 365 material may be added to the surface of the Front Curve Mold Piece 364 prior to adding the encapsulating material. In such embodiments, the resulting Ophthalmic Lens 340 may include Stabilizing Features 345 that are not fully encapsulated by the soft portion 342 of the Lens 340, such as shown in FIG. 3B. Where the Stabilizing Feature 365 is exposed, the Stabilizing Feature 365 may comprise a biocompatible material with a different swellable index than the soft portion of the Ophthalmic Lens, wherein the Stabilizing Feature 365 assumes an independent shape throughout the process of forming the Ophthalmic Lens. For example, the material of the Stabilizing Feature 365 may be partially cured prior to the addition of the encapsulant. The material of the Stabilizing Feature 365 may further comprise adhesive properties so that the Stabilizing Feature 365 may properly attach to the surface of the Ophthalmic Lens.

Alternatively, not shown, the Stabilizing Feature may be applied to the Rigid Insert prior to encapsulation. In such embodiments, the Stabilizing Feature may be aligned with the Rigid Insert prior to the molding process.

In alternative embodiments, the Stabilizing Feature 385 may be added to the Ophthalmic Lens after the encapsulant is added between the Front Curve Mold Piece 384 and the Back Curve Mold Piece 383. The addition of the Stabilizing Feature 385 may occur before the encapsulant 382 has been fully cured. For example, the Stabilizing Feature 385 may be injected into the partially cured encapsulant 382, wherein the remaining cure process fully cures the encapsulant 382 and the Stabilizing Feature 385. The material of the Stabilizing Feature 385 may have a different swellable index than the encapsulant so that, when fully cured, the Stabilizing Feature 385 may assume a specific shape. For example, the Stabilizing Feature 385 material may be injected to a specific depth within the encapsulant, wherein swelling the Stabilizing Feature 385 material during the curing process alters the front surface topography of the Ophthalmic Lens.

Proceeding to FIG. 4A, an alternative embodiment of an Ophthalmic Lens 400 that includes Stabilizing Features 405, 406 and a Rigid Insert 401. In such embodiments, the Stabilizing Features 405, 406 may be separate stabilizing inserts. Such inserts may be formed independently from the formation of the Ophthalmic Lens 400.

Proceeding to FIG. 4B, examples of embodiments of an Ophthalmic Lens 420, 440 with a Rigid Insert 421, 441 and Stabilizing Features 425, 445, wherein the Stabilizing Features 425, 445 are stabilizing inserts, are illustrated in cross section. Similar to the embodiments in FIG. 3B, the Stabilizing Features 425, 445 may be located at various depths on the Ophthalmic Lens 420, 440.

In some embodiments, the Stabilizing Feature insert 425 may be inserted within the soft portion 422 to a depth that may not alter the front surface topography of the Ophthalmic Lens 420, wherein the added mass orients the Ophthalmic Lens 420 on the eye without additional action by the user. Alternatively, the Stabilizing Feature insert 441 may be included to alter the front surface topography of the Ophthalmic Lens 440, wherein a user may orient the Ophthalmic Lens 440 on the eye by blinking. The added mass may enhance the stability of the Ophthalmic Lens 440 on the eye.

Proceeding to FIG. 4C, exemplary embodiments of an apparatus for forming an Ophthalmic Lens that includes a Rigid Insert 461, 471 and Stabilizing Feature inserts 465, 475 are shown in cross section. The Stabilizing Features 465, 475 may be included in positions relative to the Rigid Inserts 461, 471, wherein the Stabilizing Features 465, 475 may orient an Ophthalmic Lens that includes the Rigid Insert 461, 471 on the eye in a manner that enables the intended functionality of the Lens.

Stabilizing Features 465, 475 may be formed through similar process steps as a Rigid Insert 461, 471. In some embodiments, the Stabilizing Feature inserts 465, 475 may be formed through a thermoforming process. In such embodiments, alignment features may be included in the Stabilizing Features 465, 475, which may allow precise alignment between the Rigid Insert 461, 471 and the Stabilizing Features 465, 475

Similar to FIG. 3C, an Ophthalmic Lens may be formed by molding an encapsulating material, such as, for example, a hydrogel, between a Front Curve Mold 464, 474 and a Back Curve Mold 463, 473. The Rigid Insert 461, 471 may be included within the Ophthalmic Lens by placing the Rigid Insert 461, 471 between the Front and Back Curve Molds 463, 473, 464, 474 prior to adding the encapsulating material.

In some embodiments, the Stabilizing Feature inserts 465 may be placed on the Front Curve Mold 464 prior to adding the encapsulating material and separately from adding the Rigid Insert 461. The Front Curve Mold 464 may include aberrations on its surface that may secure the position of the Stabilizing Feature 465 insert. Such aberrations may allow for more precise placement of the Stabilizing Feature 465 inserts relative to the Rigid Insert 461. In such embodiments, the Stabilizing Feature 465 insert may not be fully encapsulated by the hydrogel, which may allow the Stabilizing Feature 465 to alter the front surface topography of the Ophthalmic Lens 430, as shown, for example in FIG. 4B.

In alternate embodiments, the Stabilizing Feature 475 insert may be initially adhered at a connection point 476 to the Rigid Insert 471 prior to placement between the Front Curve Mold Piece 474 and the Back Curve Mold Piece 473. Attaching the Stabilizing Feature 475 to the Rigid Insert 471 may allow for precise alignment. For example, in embodiments where the Rigid Insert 471 may be formed through a thermoforming process, the Rigid Insert 471 may be thermoformed to include alignment features that may specify the connection point 476. Such an alignment feature may indicate the intended orientation of the Rigid Insert 471, which may be particularly significant where the Rigid Insert 471 may be manufactured separately from the Stabilizing Feature 475 inserts.

In some embodiments, the adhesive material at the connection point 476 may have a different swellable index than the surrounding encapsulant. This may allow the Stabilizing Feature 475 insert to separate from the Rigid Insert 471 during the curing process. For example, the adhesive material may swell to a point that pushes the Stabilizing Feature 475 insert to alter the front surface topography of the Ophthalmic Lens 435, as shown, for example, in FIG. 4B. Such an embodiment may allow for a fully encapsulated Stabilizing Feature 475.

Proceeding to FIG. 5A, an embodiment of an Ophthalmic Lens 500 that includes a Rigid Insert 501 with Stabilizing Features 505, 506 is illustrated. In said embodiment, the Stabilizing Features 505, 506 are included with Rigid Insert 501, wherein the Rigid Insert 501 is encapsulated in a soft biocompatible material 502, such as hydrogel. In some such embodiments, the Stabilizing Features 505, 506 may be included on the Rigid Insert 501 through a thermoforming process. For example, the Rigid Insert 501 may be removed from a thermoformed sheet, which may allow for complex Rigid Insert 501 designs, wherein the Rigid Insert 501 is not symmetrical. In some thermoformed embodiments, the Rigid Insert 501 may include alignment features, wherein the Stabilizing Features 505, 506 may be affixed through a separate adhesion process, including, for example, a welding process.

Such embodiments are distinct from the examples illustrated in FIGS. 4B and 4C. In FIG. 4B, the Stabilizing Features 425, 435 may be separate from the Rigid Insert 421, 431 within the Ophthalmic Lens. The connection point 476 may be a temporary adhesion to ensure proper alignment between the Rigid Insert 471 and the Stabilizing Features 475.

Proceeding to FIG. 5B, exemplary embodiments of an Ophthalmic Lens 520, 530, 540 that include a Rigid Insert 521, 531, 541, wherein the Rigid Insert 521, 531, 541 includes Stabilizing Features 525, 535, 545, are illustrated in cross section. Some embodiments may include an Ophthalmic Lens 520, 530 with a single-piece Rigid Insert 521, 531, wherein the Rigid Insert 521, 531 includes the Stabilizing Features 525, 535. In some embodiments, the Stabilizing Feature 525 may be included with the Rigid Insert 521 in such a way that prevents the Stabilizing Feature 525 from altering the front surface topography of the Ophthalmic Lens 520. In such embodiments, the added mass of the Stabilizing Feature 525 may be sufficient to properly orient the Ophthalmic Lens 520 on the eye. Alternatively, the Stabilizing Feature 535 may extend from the Rigid Insert 531 to alter the front surface topography of the Ophthalmic Lens 530, wherein the eyelid may catch the protrusion. In such embodiments, the user may realign the Ophthalmic Lens 530 through blinking.

In other embodiments, the Rigid Insert 541, 551 may comprise a multi-piece Rigid Insert. The Rigid Insert 541, 551 may include a front insert piece 547, 557 and a back insert piece 548, 558. In some such embodiments, the front insert piece 547, 557 and back insert piece 548, 558 may create a cavity, which, for example, may allow for the inclusion of electrically active elements and a variable optic portion. Alternatively, the front insert piece 547, 557 and the back insert piece 548, 558 may comprise two passive layers that may be combined to provide functionality to the Ophthalmic Lens 540, 550.

For embodiments with multi-piece Rigid Inserts 541, 551, Stabilizing Features 545, 555 may be included through various methods. In some embodiments, the back insert piece 548 or the front insert piece 542 may include the Stabilizing Feature 545, for example, through a thermoforming process as may apply for a single-piece Rigid Insert 521, 531. In such embodiments, the front insert piece 547 may be attached to the back insert piece 548 in a separate step than the inclusion of the Stabilizing Feature 545.

Alternatively, the Stabilizing Feature 555 may be included in the Rigid Insert 551 when the front insert piece 557 is attached to the back insert piece 558. In such embodiments, the Stabilizing Feature may be placed between the front insert piece 557 and the back insert piece 558. The front insert piece 557, back insert piece 558, and the Stabilizing Feature 55 may be attached through a variety of means, including, for example, adhesion, welding, or interconnecting alignment features. In embodiments that include thermoforming, the front insert piece 557, back insert piece 558, and Stabilizing Features 555 may include alignment features to ensure the proper orientation of the Ophthalmic Lens 550 on the eye relative to the Rigid Insert 551.

Materials for Insert Based Ophthalmic Lenses

In some embodiments, a lens type can be a lens that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, which sometimes may be called an insert encapsulating layer, that surrounds the insert may be comprised of standard hydrogel lens formulations. Exemplary materials with characteristics that may provide an acceptable match to numerous insert materials may include the Narafilcon family; including Narafilcon A and Narafilcon B. Alternatively, the Etafilcon family; including Etafilcon A may represent good exemplary material choices. A more technically inclusive discussion follows on the nature of materials consistent with the art herein; but it may be clear that any material which may form an acceptable enclosure or partial enclosure of the sealed and encapsulated inserts are consistent and included.

Suitable silicone containing components include compounds of Formula I

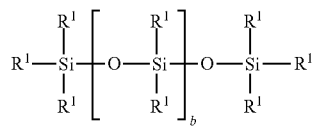

where:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$ alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-, 2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a Reactive Mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

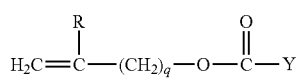

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

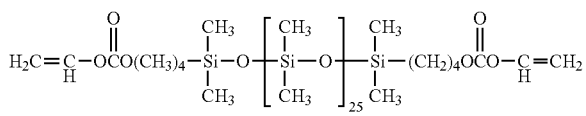

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

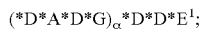

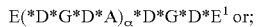

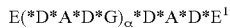

Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
*X* denotes a urethane or ureido linkage;
a is at least 1;
A denotes a divalent polymeric radical of formula:

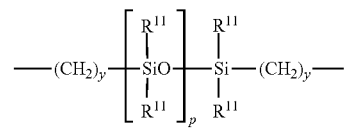

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

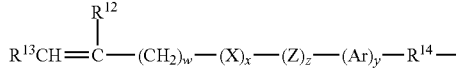

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula: Formula IX (the full structure may be understood by joining corresponding asterisk regions, * to *,  to )

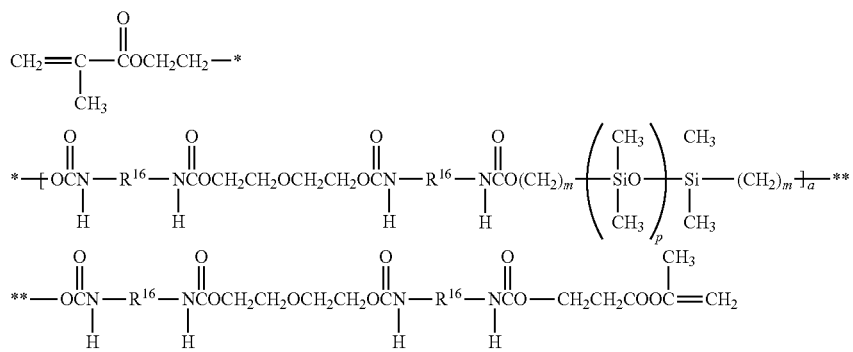

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X (the full structure may be understood by joining corresponding asterisk regions, * to *)

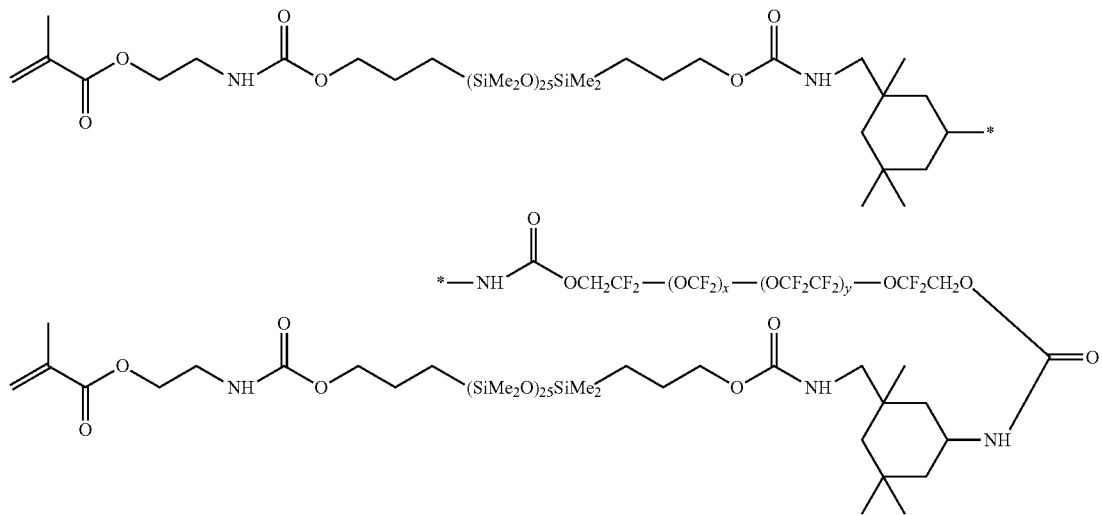

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Methods

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Proceeding to FIG. 6, an exemplary flowchart for forming an Ophthalmic Lens with Stabilizing Features and a Rigid Insert is illustrated. At 605, a Rigid Insert may be formed, wherein the functionality depends on a specific orientation relative to the Optic Zone. At 610, a material may be deposited on the Front Curve Mold Piece, wherein the material may be the Stabilizing Feature included in the Ophthalmic Lens. At 615, the material may be partially cured, allowing the Stabilizing Feature to become firmer and able to maintain a shape. At 620, the material may be exposed to adhesion promoting processes, wherein the promotion increases the adhesive properties between the Stabilizing Feature material and the Reactive Monomer Mixture. At 625, the Rigid Insert may be aligned with the Stabilizing Feature, wherein the alignment ensures the functionality of the Rigid Insert when the Ophthalmic Lens is oriented on the eye. At 630, the Rigid Insert may be placed between a Front Curve Mold Piece and a Back Curve Mold Piece. At 635, a Reactive Monomer Mixture may be deposited on the Front Curve Mold Piece. At 640, the Front Curve Mold Piece may be positioned in proximity to the Back Curve Mold Piece, wherein the positioning allows the RMM to encapsulate the Rigid Insert. In some embodiments, at 645, the RMM may be polymerized to for the Ophthalmic Lens. Where the deposition of the Stabilizing Features, at 610, may occur after the partial cure. In such embodiments, the Stabilizing Features may be injected at a specific depth within the RMM.

Proceeding to FIG. 7, an exemplary flowchart for forming an Ophthalmic Lens with Stabilizing Feature inserts. At 705, a Rigid Insert may be formed, wherein the functionality depends on a specific orientation relative to the Optic Zone. At 710, the Stabilizing inserts may be placed between the Front Curve Mold Piece and the Back Curve Mold Piece, wherein the insert may orient the Ophthalmic Lens on the eye.

Figure 8:
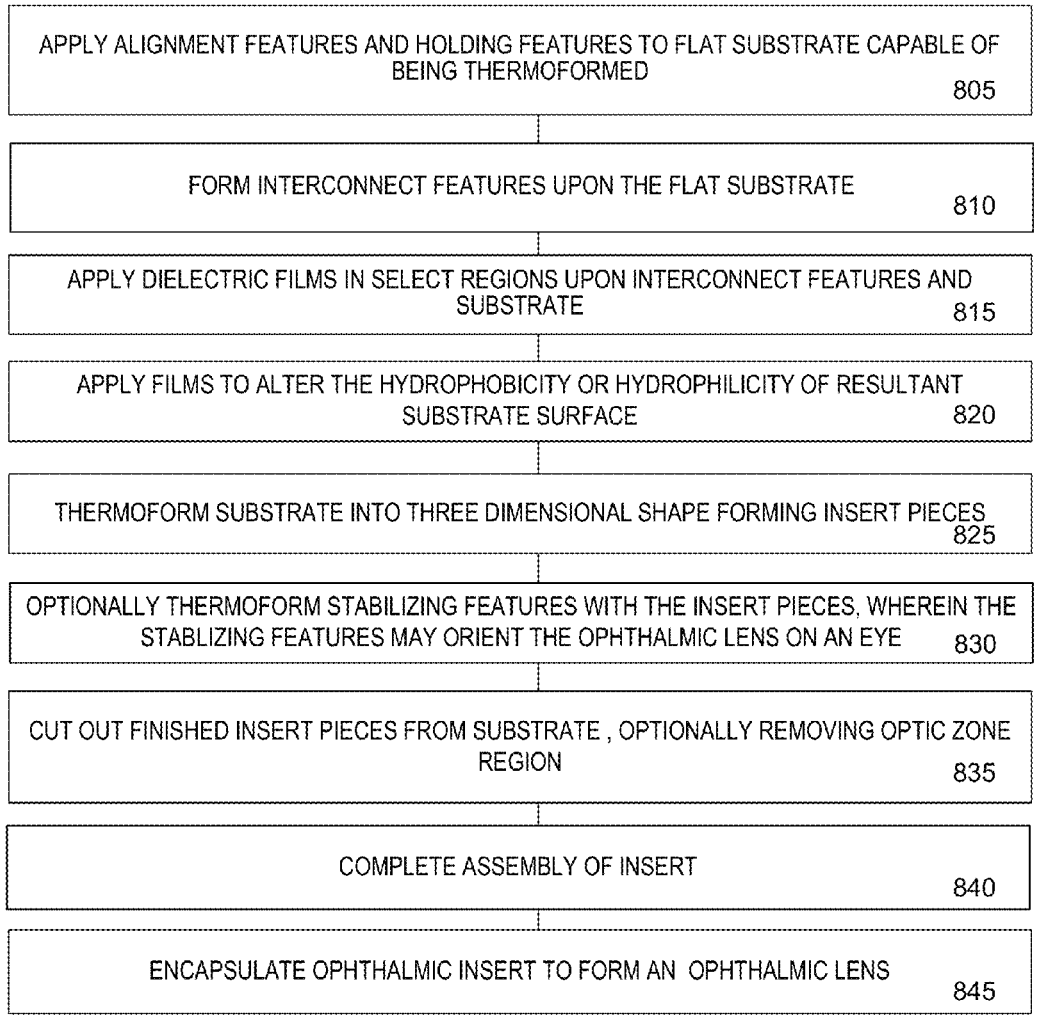
FIG. 8 illustrates an exemplary process flowchart for forming a Rigid Insert through a thermoforming process.

Proceeding to FIG. 8, an exemplary flowchart for forming a Rigid Insert with Stabilizing Feature through a thermoforming process is illustrated. At 805, a flat substrate typically in the form of a sheet of material may have alignment features imparted to it. These features may be stamped or cut out shapes made into the sheet or deformed regions as a stamp may provide without cutting material. Some embodiment may include an alignment feature printed upon the sheet.

In other embodiments, the surface or bulk of the sheet may have altered coloration by various processes including thermal treatments. The shapes may include crosses, verniers, multidirectional lines or the like, which when observed by a processing tool may allow for the unambiguous translational and rotational alignment of the piece. In addition, in some embodiments holding features that may fixedly lock into place the substrate during processing may be formed. These features may be cut out features of various shapes that allow locating pins or components to feed through the substrate sheet in defined manners.

At 810, in some embodiments that require electrical traces to be formed, these interconnect features may be formed upon the flat substrate in defined locations relative to the alignment features. The methods of forming these interconnect features may include, for example, deposition and patterned etching; direct writing of interconnect features as may be the case with laser induced chemical vapor deposition; printing upon the substrate, such as with conductive ink printing; or patterned by the screened deposition of conductive material. In a specialized version of the processing, in some embodiments, the definition of alignment features and the placement of interconnect features may be performed simultaneously in the same processing steps.

At 815 in some embodiments, dielectric or insulating films may be formed in selected regions. These may cover and insulate the traces in the regions of deposition. The dielectric or insulating films may be deposited in blanket fashion followed by a patterned etching process, may be printed from an insulating ink material, or may be regionally deposited by a screened deposition process.

At 820 in some embodiments, and particularly in those embodiments that form an electro-wetting based meniscus lens active optic element, a film may be regionally applied to alter the hydrophobicity of the applied substrate and substrate features surface. The method of application may follow those discussed in general for steps 810 and 815.

At 825, the thin sheet with any applied films may next be subjected to a thermoforming process. In many embodiments, the alignment features formed in steps 805 or 810 may be used to align the thin film substrate with the correct location relative to a mold piece upon which the substrate may be thermoformed into a desired three dimensional shape. In some embodiments, the processing may occur for a single molding feature at a time, in others multiple thermoforming heads may be simultaneous applied to substrate material to create a number of thermoformed features.

There may be numerous steps that are next performed on the three-dimensionally formed substrate. At 830, Stabilizing Features may be included on the thermoformed sheet. In some embodiments, the Stabilizing Features may thermoformed onto the sheet in a similar or the same thermoforming process as applied to the entire sheet, at 825. The thermoforming process may extend the Stabilizing Features at a specific angle and distance from the insert pieces, which may define the depth of the Stabilizing Features within the Ophthalmic Lens.

At 835, the thermoformed substrate may have insert pieces cut from it. Again, the alignment features of step 805 or 810 may be useful to insure the correct alignment of the cutting process to the various aligned features of and on the Three-dimensional Substrate. In some embodiments, the insert pieces may be cut out from the sheet at 835 to include the Stabilizing Features, which may allow for alignment between the insert piece and the Stabilizing Features when the insert piece is formed. In embodiments where the Rigid Insert or Media Insert comprises multiple pieces, at least one insert piece may include the Stabilizing Feature.

The cutting process may be performed by mechanical sheering, as may occur with a sharp stamping process or other sheering process, and may introduce into the singulated or cut-out insert piece other alignment features to simultaneously register alignment even if the previous alignment features are removed from the insert piece by the cutting operation. These new alignment features may include, for example, notches, slots, rounds, and flats or various combinations of these. The resulting insert piece may comprise the insert in cases of a single piece insert.

In multi-piece Rigid Inserts, at 840, the resulting insert piece may be combined with other three-dimensionally shaped features or with other insert pieces. When the insert piece is sealed, joined, or connected to the other three-dimensional insert pieces, together they may form an ophthalmic insert. In some such embodiments, the step at 840 may utilize a thermoforming process, for example, where multiple pieces are constructed in concert or where the functional features are not susceptible to thermoforming temperatures.

At 845, the resulting ophthalmic insert may be encapsulated with Ophthalmic Lens forming materials to form an Ophthalmic Device. For example, the Ophthalmic Lens may be formed by placing a formed insert between two mold parts and by reacting a Lens-forming Mixture molding the insert piece to be within the Ophthalmic Lens. The molding process may also occur in multiple steps where a thin layer of Reactive Mixture may be initially formed on a mold surface followed by the placement of the insert and fixed by reacting the Reactive Mixture. The combination of a first Ophthalmic Lens layer and the insert is then formed with additional Reactive Mixture between the molds into an Ophthalmic Lens. The various materials that have been discussed may be used alone or in combination to form an Ophthalmic Device that includes an embedded insert, which may include three-dimensional pieces that have been formed by thermoforming Although the invention may be used to provide inserts containing hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators.

Suitable materials include, without limitation, silicone hydrogels made from silicone macromers and hydrophilic monomers.

CONCLUSION

The present invention, as described above and as further defined by the claims below, provides methods for creating an Ophthalmic Lens with Stabilizing Features and a Rigid Insert, where the Stabilizing Features may orient the Ophthalmic Lens when placed on an eye. In some embodiment, the Stabilizing Features may be included as a unique Reactive Monomer Mixture with separate properties than the encapsulating RMM. Other embodiments may include Stabilizing Features comprising separate insert pieces. In alternate embodiments, the Rigid Insert may include the Stabilizing Features, such as, for example, through thermoforming techniques.

The invention claimed is:

1. A method of manufacturing an ophthalmic device comprising the steps of:
   providing a front curve mold part and a back curve mold part;
   forming a rigid insert that provides orientation-specific functionality by a method comprising thermoforming a formable sheet into a predetermined three-dimensional topography;
   placing at least one stabilizing feature in a location to be between the back curve mold part and the front curve mold part, wherein the stabilizing feature is capable of orienting the ophthalmic device on an eye;
   placing the rigid insert at a location to be between the back curve mold part and the front curve mold part at a predetermined position in relation to the stabilizing feature;
   depositing a reactive monomer mixture on one or both the front curve mold part and the back curve mold part;
   positioning the back curve mold part proximate to the front curve mold part to form a cavity, wherein the reactive monomer mixture, the rigid insert and the stabilizing feature reside within the cavity;
   curing the reactive monomer mixture to form a biocompatible material;
   demolding the front curve mold part and the back curve mold part;
   removing the ophthalmic device from the demolded front curve mold part and back curve mold part; and
   hydrating the ophthalmic device.

2. The method of claim 1, further comprising the step of:
   injecting the stabilizing feature into the reactive monomer mixture.

3. The method of claim 1, wherein the stabilizing feature comprises at least one stabilizing insert piece.

4. The method of claim 3, wherein the stabilizing insert piece comprises a thermoformed three-dimensional topography.

5. The method of claim 1, wherein the stabilizing feature is positioned at an aberration on a surface of the front curve mold part in contact with the reactive monomer mixture.

6. The method of claim 1, wherein the reactive monomer mixture and the stabilizing feature are added simultaneously.

7. The method of claim 1, wherein the stabilizing feature comprises a coloration or a marking, wherein the coloration or the marking provides a visual orientation cue.

8. The method of claim 1, wherein the stabilizing feature comprises a curable material, wherein a swellable index of the curable material is different from a swellable index of the biocompatible material.

9. The method of claim 3, further comprising the steps of:
   aligning the stabilizing insert piece with the functionality of the rigid insert; and
   adhering the stabilizing insert piece to the rigid insert.

10. The method of claim 9, wherein the stabilizing insert piece is temporarily adhered to the rigid insert with a second curable material.

11. The method of claim 10, further comprising the step of:
    curing the second curable material after encapsulation of the rigid insert, wherein the curing separates the stabilizing insert from the rigid insert.

12. The method of claim 1, wherein the rigid insert and the stabilizing feature are positioned in alignment.

13. The method of claim 1, wherein the rigid insert piece is a multi-piece rigid insert.

14. The method of claim 13, wherein the multi-piece rigid insert comprises a back curve piece and a front curve piece.

15. A method of manufacturing an ophthalmic device comprising the steps of:
    providing a front curve mold part and a back curve mold part;
    forming a rigid insert that provides orientation-specific functionality with integral stabilizing features by a method comprising thermoforming a formable sheet into a predetermined three-dimensional topography that provides stabilizing features;
    placing the rigid insert at a location to be between the back curve mold part and the front curve mold part;
    depositing a reactive monomer mixture on one or both the front curve mold part and the back curve mold part;
    positioning the back curve mold part proximate to the front curve mold part to form a cavity, wherein the reactive monomer mixture, the rigid insert and the stabilizing feature reside within the cavity;
    curing the reactive monomer mixture to form a biocompatible material;
    demolding the front curve mold part and the back curve mold part;
    removing the ophthalmic device from the demolded front curve mold part and back curve mold part; and
    hydrating the ophthalmic device.

* * * * *